(12) United States Patent
Tomimatsu

(10) Patent No.: US 10,534,807 B2
(45) Date of Patent: Jan. 14, 2020

(54) INFORMATION PROCESSING APPARATUS FOR NOTIFYING PLANNED USE TIME AND CONTROL METHOD OF INFORMATION PROCESSING APPARATUS FOR NOTIFYING PLANNED USE TIME

(71) Applicant: KYOCERA Document Solutions Inc., Osaka-shi, Osaka (JP)

(72) Inventor: Tetsuo Tomimatsu, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 196 days.

(21) Appl. No.: 15/690,116

(22) Filed: Aug. 29, 2017

(65) Prior Publication Data

US 2018/0060322 A1 Mar. 1, 2018

(30) Foreign Application Priority Data

Aug. 30, 2016 (JP) .................................. 2016-167952

(51) Int. Cl.
*G06F 15/00* (2006.01)
*G06F 3/12* (2006.01)
(Continued)

(52) U.S. Cl.
CPC ........ *G06F 16/489* (2019.01); *G06F 16/5866* (2019.01)

(58) Field of Classification Search
CPC ............. H04N 1/00204; H04N 1/0035; H04N 1/2307; H04N 1/2392; G06F 16/489; G06F 16/5866
(Continued)

(56) References Cited

U.S. PATENT DOCUMENTS

| 2005/0259584 A1* | 11/2005 | Chen ....................... H04L 12/18 370/238 |
| 2007/0180253 A1 | 8/2007 | Hamaguchi |
| 2011/0211218 A1* | 9/2011 | Gilmore ................ G06F 3/1207 358/1.15 |

FOREIGN PATENT DOCUMENTS

| JP | 2006198957 A | 8/2006 |
| JP | 2007208573 A | 8/2007 |

(Continued)

OTHER PUBLICATIONS

Japanese Patent Office, Office Action Issued in Application No. 2016167952, dated Jan. 8, 2019, 5 pages.

*Primary Examiner* — Douglas Q Tran
(74) *Attorney, Agent, or Firm* — Alleman Hall Creasman & Tuttle LLP

(57) ABSTRACT

An information processing apparatus includes a use determination processing portion, a first acquisition processing portion, and a time notification processing portion. The use determination processing portion determines whether or not its associated information processing apparatus is in use. The first acquisition processing portion, when a use request of its associated information processing apparatus is received in a state where the use determination processing portion has determined that its associated information processing apparatus is in use, acquires a planned use time of its associated information processing apparatus via an input operation performed on an operation portion of its associated information processing apparatus. The time notification processing portion notifies a first information processing apparatus that is a transmission source of the use request, of the planned use time acquired by the first acquisition processing portion.

9 Claims, 5 Drawing Sheets

(51) Int. Cl.
*G06K 1/00* (2006.01)
*G06F 16/48* (2019.01)
*G06F 16/58* (2019.01)

(58) Field of Classification Search
USPC .............................. 358/1.1, 1.15, 1.13, 1.14
See application file for complete search history.

(56) References Cited

FOREIGN PATENT DOCUMENTS

| | | | |
|---|---|---|---|
| JP | 2009187276 A | 8/2009 |
| JP | 2010016472 A | 1/2010 |
| JP | 2010023451 A | 2/2010 |

\* cited by examiner

FIG. 3

```
CURRENT STATE: IN USE

DO YOU QUEUE?

[ YES ]
    [ NO ]
```
91a

FIG. 4

```
OTHER USERS ARE QUEUING.
PLEASE INPUT YOUR PLANNED USE TIME.

[    ] MINUTE(S)

```
CURRENT STATE: IN USE
PLANNED USE TIME: 5 MINUTES REMAINING

NUMBER OF USERS IN WAITING QUEUE: 1
YOUR NUMBER IN WAITING QUEUE: 1

[ CANCEL QUEUING ]
```
91a

| WAITING QUEUE INFORMATION | |
|---|---|
| NUMBER IN WAITING QUEUE | ADDRESS INFORMATION |
| 1 | ADDRESS A |
| 2 | ADDRESS B |
| 3 | ADDRESS C |

OTHER USERS ARE QUEUING AFTER YOU.
PLEASE INPUT YOUR PLANNED USE TIME.

[     ] MINUTE(S)

CURRENT STATE: IN USE
PLANNED USE TIME: 3 MINUTES REMAINING

NUMBER OF USERS IN WAITING QUEUE: 2
YOUR NUMBER IN WAITING QUEUE: 2

PLANNED USE TIME OF FIRST USER IN
WAITING QUEUE: 10 MINUTES ns# INFORMATION PROCESSING APPARATUS FOR NOTIFYING PLANNED USE TIME AND CONTROL METHOD OF INFORMATION PROCESSING APPARATUS FOR NOTIFYING PLANNED USE TIME

INCORPORATION BY REFERENCE

This application is based upon and claims the benefit of priority from the corresponding Japanese Patent Application No. 2016-167952 filed on Aug. 30, 2016, the entire contents of which are incorporated herein by reference.

BACKGROUND

The present disclosure relates to an information processing apparatus and a control method of an information processing apparatus.

In general, in a case where a user (hereinafter referred to as "user A") is using an image processing apparatus and another user (hereinafter referred to as "user B") wants to use the same image processing apparatus, the user B needs to, for example, line up behind the user A and wait until the user A ends the use of the image processing apparatus.

There is known an image processing apparatus that, after receiving from a client PC, request information that requests occupation of the image processing apparatus, notifies the client PC that occupation of the image processing apparatus has become available, at a time point when the occupation by a user of the client PC has become available. According to this image processing apparatus, the user of the client PC only has to wait in front of the client PC, and does not need to wait in the vicinity of the image processing apparatus.

SUMMARY

An information processing apparatus according to an aspect of the present disclosure includes a use determination processing portion, a first acquisition processing portion, and a time notification processing portion. The use determination processing portion determines whether or not its associated information processing apparatus is in use. The first acquisition processing portion, when a use request of its associated information processing apparatus is received in a state where the use determination processing portion has determined that its associated information processing apparatus is in use, acquires a planned use time of its associated information processing apparatus via an input operation performed on an operation portion of its associated information processing apparatus. The time notification processing portion notifies a first information processing apparatus that is a transmission source of the use request, of the planned use time acquired by the first acquisition processing portion.

A control method of an information processing apparatus according to another aspect of the present disclosure includes a use determination step, a first acquisition step, and a time notification step. In the use determination step, it is determined whether or not its associated information processing apparatus is in use. In the first acquisition step, when a use request of its associated information processing apparatus is received in a state where the use determination step has determined that its associated information processing apparatus is in use, a planned use time of its associated information processing apparatus is acquired via an input operation performed on an operation portion of its associated information processing apparatus. In the time notification step, a first information processing apparatus that is a transmission source of the use request, is notified of the planned use time acquired in the first acquisition step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram showing an example of a display screen of an information processing apparatus connected to the image processing apparatus according to the embodiment of the present disclosure.

FIG. 4 is a diagram showing an example of an input screen displayed on the image processing apparatus according to the embodiment of the present disclosure.

FIG. 5 is a diagram showing an example of a display screen of the information processing apparatus connected to the image processing apparatus according to the embodiment of the present disclosure.

FIG. 7 is a diagram showing an example of waiting queue information used in the image processing apparatus according to the embodiment of the present disclosure.

FIG. 8 is a diagram showing an example of a display screen of the information processing apparatus connected to the image processing apparatus according to the embodiment of the present disclosure.

FIG. 9 is a diagram showing an example of a display screen of the information processing apparatus connected to the image processing apparatus according to the embodiment of the present disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
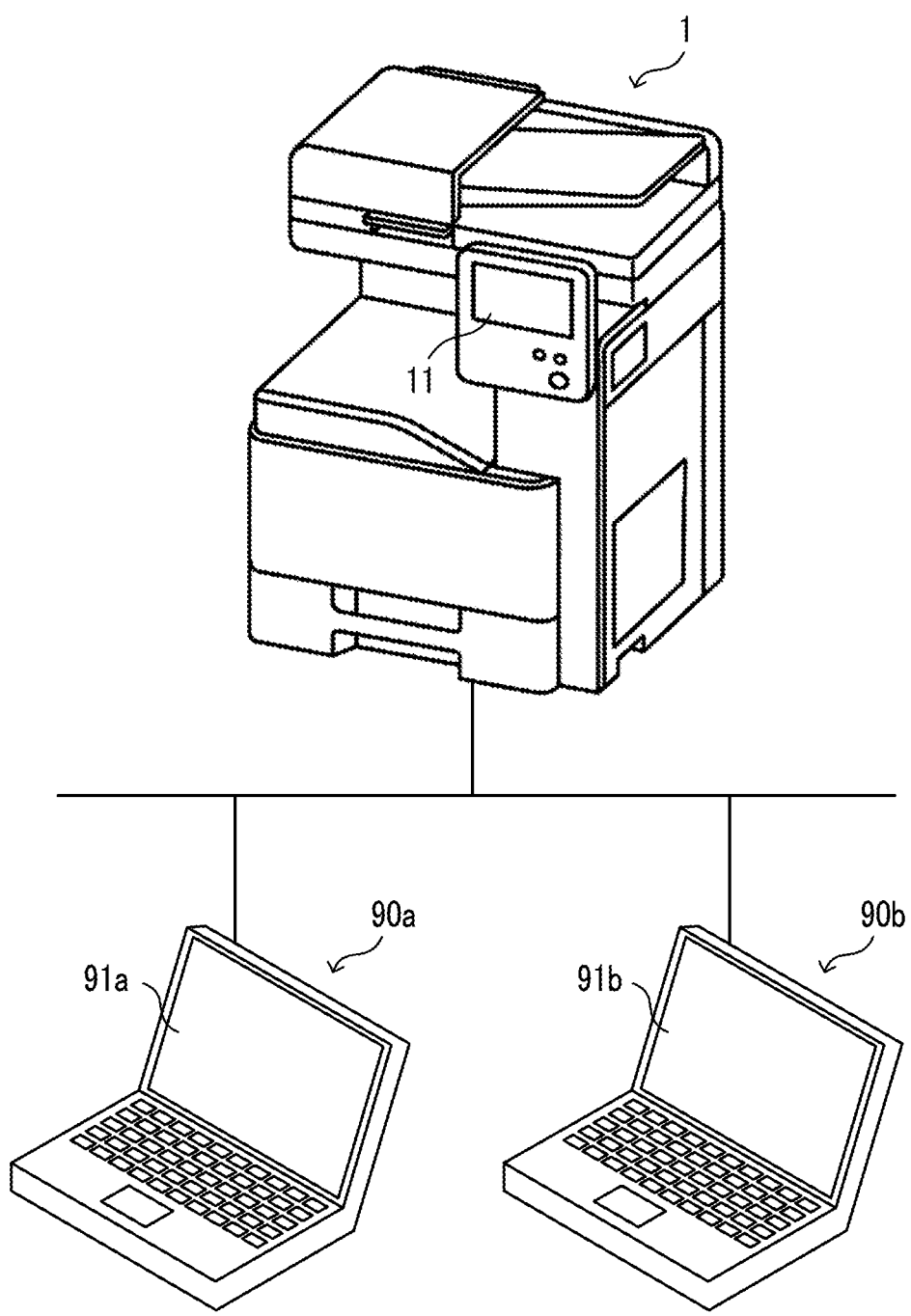
FIG. 1 is a diagram showing a network configuration including an image processing apparatus according to an embodiment of the present disclosure.

As shown in FIG. 1, an image processing apparatus 1 according to the embodiment of the present disclosure is communicably connected to information processing apparatuses 90*a* and 90*b* via a network.

The image processing apparatus 1 is an example of the "information processing apparatus" of the present disclosure, the information processing apparatus 90*a* is an example of the "first information processing apparatus" of the present disclosure, and the information processing apparatus 90*b* is an example of the "second information processing apparatus" of the present disclosure. Each of the information processing apparatuses 90a and 90b may be a notebook personal computer, a desktop personal computer, a tablet, a smartphone or the like. It is noted that in the following description, each of the information processing apparatuses 90a and 90b may be generally called as an information processing apparatus 90.

Figure 2:
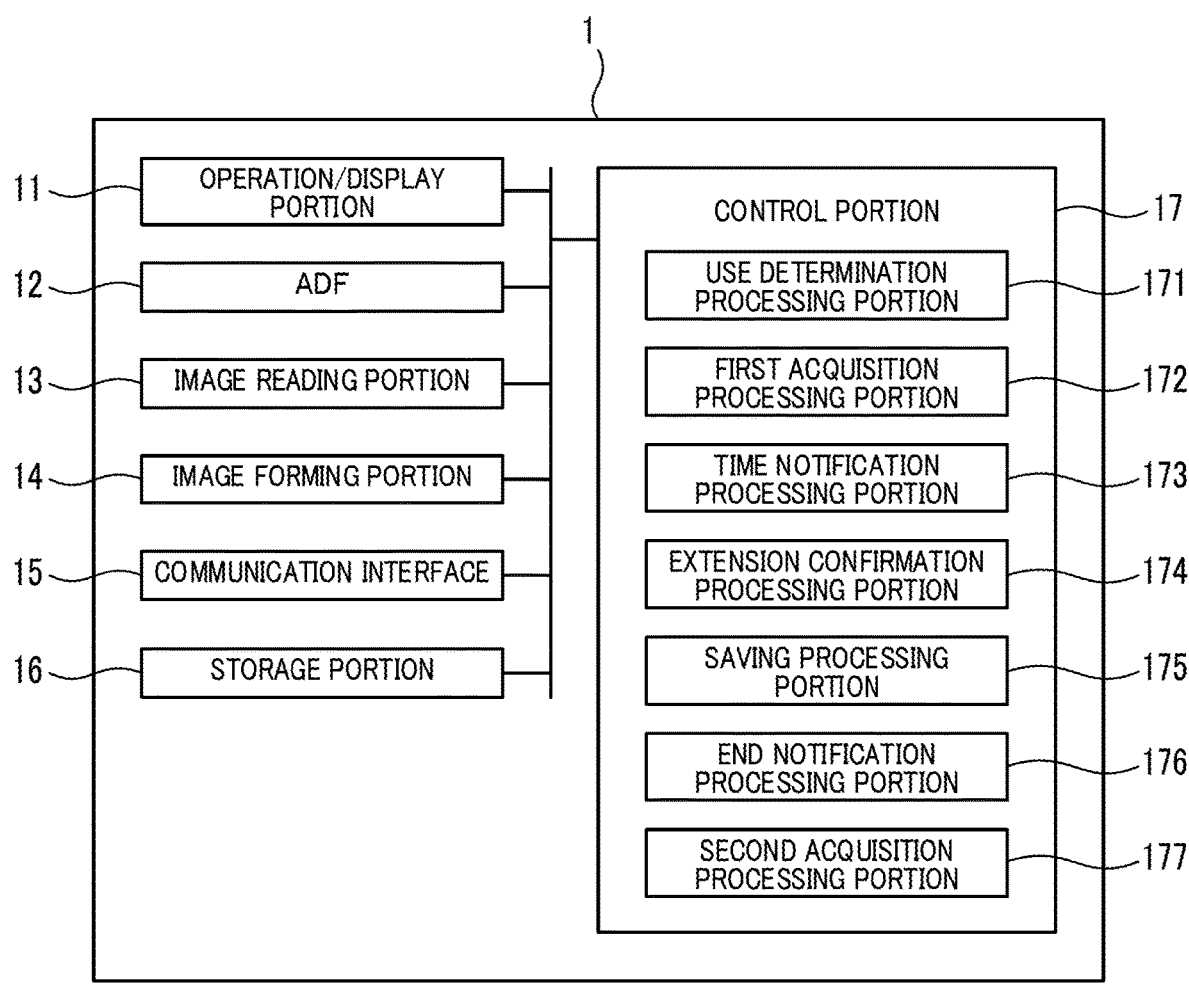
FIG. 2 is a block diagram showing a system configuration of the image processing apparatus according to the embodiment of the present disclosure.

As shown in FIG. 2, the image processing apparatus 1 includes an operation/display portion 11, an ADF 12, an image reading portion 13, an image forming portion 14, a communication interface 15, a storage portion 16, and a control portion 17. Specifically, the image processing apparatus 1 is a multifunction peripheral having a plurality of functions such as a printer function, a scanner function, a copy function, and a facsimile function. It is noted that the present disclosure is not limited to a multifunction peripheral, but is applicable to an arbitrary information processing apparatus. For example, the present disclosure is applicable to an image processing apparatus that includes at least one of the image reading portion 13 and the image forming portion 14.

The operation/display portion 11 includes a display portion and an operation portion, wherein the display portion is, for example, a liquid crystal display and displays information, and the operation portion includes a touch panel and operation buttons for receiving user operations.

The ADF 12 is an automatic document feeding device including a document sheet setting portion, conveyance rollers, a document sheet pressing, and a sheet discharge portion, and conveys a document sheet so that it is read by the image reading portion 13.

The image reading portion 13 includes a document sheet table, a light source, a mirror, an optical lens, and a CCD (Charge Coupled Device), and is configured to read an image from a document sheet and output the image as image data.

The image forming portion 14 is configured to execute a printing process by the electrophotographic method or the inkjet method to form an image on a sheet based on image data. For example, when the image forming portion 14 is an electrophotographic image forming portion, the image forming portion 14 includes a photoconductor drum, a charger, an exposure device, a developing device, a transfer device, and a fixing device.

The communication interface 15 is configured to perform communications with external information processing apparatuses such as a facsimile apparatus or a personal computer, via a communication network such as a telephone line, the Internet, or a LAN, in accordance with a predetermined communication protocol.

The storage portion 16 is a nonvolatile storage portion such as a hard disk or an EEPROM™. The storage portion 16 stores various control programs that cause the control portion 17 to execute, for example, a waiting time notification process (see FIG. 6) that is described below, and stores various types of data as well.

The control portion 17 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Specifically, the control portion 17 includes a use determination processing portion 171, a first acquisition processing portion 172, a time notification processing portion 173, an extension confirmation processing portion 174, a saving processing portion 175, an end notification processing portion 176, and a second acquisition processing portion 177. It is noted that the control portion 17 functions as these processing portions when it executes various processes in accordance with the control programs. In addition, the control portion 17 may include an electronic circuit that implements part or all of processing functions of the processing portions.

Meanwhile, to use a function of the image processing apparatus 1 such as the scanner function, the copy function, or the facsimile function, the user needs to perform an operation on the operation/display portion 11 of the image processing apparatus 1. As a result, in a case where a user (hereinafter referred to as "user A") is using the image processing apparatus 1 and another user (hereinafter referred to as "user B") wants to use the image processing apparatus 1, the user B needs to, for example, line up behind the user A and wait until the user A ends the use of the image processing apparatus 1.

There is known an image processing apparatus that, after receiving, from a client PC, request information that requests occupation of the image processing apparatus, notifies the client PC that occupation of the image processing apparatus has become available, at a time point when the occupation by a user of the client PC has become available. According to this image processing apparatus, the user of the client PC only has to wait in front of the client PC, and does not need to wait in the vicinity of the image processing apparatus. However, the waiting user does not know how long he/she has to wait until he/she can use the image processing apparatus. This makes it difficult for the user to do other works while he/she is waiting.

On the other hand, in the image processing apparatus 1 according to the present embodiment, it is possible to notify the waiting user of an approximate time when the user will become able to use the image processing apparatus 1.

The following describes an operation of the image processing apparatus 1 with reference to FIG. 3 to FIG. 5. It is noted here that the following describes an operation of the image processing apparatus 1 in a case where a first user is using the image processing apparatus 1 at present and a second user wants to use the image processing apparatus 1 after the first user.

When the second user activates a printer driver installed in the information processing apparatus 90a, a communication is performed between the information processing apparatus 90a and the image processing apparatus 1, and the information processing apparatus 90a is notified of the current state of the image processing apparatus 1. Subsequently, the printer driver displays, for example, the screen shown in FIG. 3 on a display portion 91a of the information processing apparatus 90a. The screen shown in FIG. 3 indicates that the image processing apparatus 1 is currently in use. It is noted that the use determination processing portion 171 of the image processing apparatus 1 determines whether or not the image processing apparatus 1 is in use. In this example, in a case where one or more users are logged in the image processing apparatus 1, the use determination processing portion 171 determines that the image processing apparatus 1 is in use. It is noted that the use determination processing portion 171 may determine that the image processing apparatus 1 is in use, in a case where an operation on the operation/display portion 11 of the image processing apparatus 1 has been continuously performed for a predetermined time period without interruption.

The screen shown in FIG. 3 includes buttons for selecting whether or not to queue for a turn. When the second user selects the "yes" button in the screen of FIG. 3, the printer driver sends a use request to the image processing apparatus 1.

When a use request of the image processing apparatus 1 (hereinafter referred to as an "its associated image processing apparatus") is received in a state where the use determination processing portion 171 has determined that its associated image processing apparatus is in use, the first acquisition processing portion 172 of the image processing apparatus 1 acquires a planned use time of its associated image processing apparatus via an input operation performed on the operation/display portion 11. Specifically, the first acquisition processing portion 172 displays an input screen for the planned use time on the operation/display portion 11, and acquires the planned use time via an input operation performed on the input screen.

For example, when the image processing apparatus 1 receives a use request from the information processing apparatus 90a while the first user is using the image processing apparatus 1, the image processing apparatus 1 displays the input screen shown in FIG. 4 on the operation/display portion 11. When, on the input screen, the first user inputs the planned use time of the image processing apparatus 1 (namely, how more minutes he/she is planning to use the image processing apparatus 1) and presses the "OK" button, the first acquisition processing portion 172 acquires, as the planned use time, the time input by the first user.

The time notification processing portion 173 of the image processing apparatus 1 notifies the information processing apparatus 90a that is the transmission source of the use request, of the planned use time acquired by the first acquisition processing portion 172.

The printer driver of the information processing apparatus 90a displays, on the display portion 91a, the planned use time notified from the time notification processing portion 173 of the image processing apparatus 1. For example, the screen shown in FIG. 5 is displayed on the display portion 91a. The screen shown in FIG. 5 displays the planned use time that was input by the first user. In addition, the screen shown in FIG. 5 displays the number of users in the waiting queue, and what number in the waiting queue the second user is. These pieces of information are notified from the image processing apparatus 1 together with the planned use time. It is noted that the screen shown in FIG. 5 also displays a "cancel queuing" button. By pressing the button as necessary, the second user can cancel queuing for his/her turn.

By seeing the screen shown in FIG. 5 displayed on the display portion 91a, the second user recognizes an approximate time when the user will become able to use the image processing apparatus 1. This allows the second user to perform other works as necessary during the waiting time, and use the waiting time efficiently. It is noted that the planned use time displayed on the screen of FIG. 5 is counted down over time. This allows the second user to easily grasp the remaining time until the second user becomes able to use the image processing apparatus 1.

Similar to the screen shown in FIG. 5, the operation/display portion 11 of the image processing apparatus 1 also displays the number of users who are in the waiting queue at present. In addition, similar to the screen shown in FIG. 5, the planned use time displayed on the operation/display portion 11 of the image processing apparatus 1 is also counted down over time. This allows the first user to easily grasp the remaining time of the planned use time that was input by the first user himself/herself.

When the remaining time of the planned use time has reached a predetermined time after the acquisition of the planned use time by the first acquisition processing portion 172, the extension confirmation processing portion 174 confirms whether or not the planned use time needs to be extended, via an input operation performed on the operation/display portion 11. For example, when the remaining time of the planned use time has become zero, the extension confirmation processing portion 174 displays a confirmation screen (not shown) on the operation/display portion 11, wherein the confirmation screen asks the first user whether or not the planned use time should be extended. The extension confirmation processing portion 174 then determines whether or not to extend the planned use time, based on a selection operation performed by the first user on the confirmation screen (for example, based on which of an "extend" button or a "not extend" button was pressed).

In a case where the extension confirmation processing portion 174 has confirmed that the planned use time needs to be extended, the first acquisition processing portion 172 acquires a new planned use time (namely, an extension time) via an input operation performed on the operation portion. For example, the first acquisition processing portion 172 displays an input screen (not shown) for inputting the extension time, on the operation/display portion 11, and acquires a new planned use time via an input operation of the extension time performed on the input screen. Subsequently, the time notification processing portion 173 notifies the information processing apparatus 90a of the new planned use time acquired by the first acquisition processing portion 172. As a result, for example, "planned use time: 5 minutes remaining (5 minutes of extension)" is displayed on the display portion 91a of the information processing apparatus 90a.

In a case where the extension confirmation processing portion 174 has confirmed that the planned use time does not need to be extended, a log-off process of logging off the first user is executed in the image processing apparatus 1. At this time, in a case where the extension confirmation processing portion 174 has confirmed that the planned use time does not need to be extended, the saving processing portion 175 saves, as necessary, current setting information that has been set via an input operation performed on the operation/display portion 11. For example, the saving processing portion 175 displays a confirmation screen (not shown) on the operation/display portion 11, wherein the confirmation screen asks the first user whether or not the current setting information should be saved. Subsequently, the saving processing portion 175 saves the current setting information in response to a predetermined operation of the user performed on the confirmation screen (for example, a press of the "save" button). The setting information is stored in the storage portion 16 or the like in association with identification information of the first user who is currently logged in. When the first user logs in next time, the setting information is read, and the first user can resume operation of the image processing apparatus 1 to continue the previous operation.

In a case where the use determination processing portion 171 has determined that its associated image processing apparatus is not in use after the time notification processing portion 173 notified the information processing apparatus 90a of the planned use time, the end notification processing portion 176 of the image processing apparatus 1 notifies the information processing apparatus 90a that its associated image processing apparatus has become usable. That is, when the first user who used the image processing apparatus 1 has logged off, the end notification processing portion 176 notifies the information processing apparatus 90*a* that the image processing apparatus 1 has become usable. Upon the notification, for example, a message "The multifunction peripheral has become usable. It is your turn." is displayed on the display portion 91*a* of the information processing apparatus 90*a*. At this time, this notification may be transferred from the information processing apparatus 90*a* to a mobile terminal of the second user. With this transfer, even when the second user is working at a place located away from the information processing apparatus 90*a*, the second user can recognize that the copier has become usable. This allows the second user to use the waiting time efficiently.

It is noted that, when a use request for use of its associated image processing apparatus is received from the information processing apparatus 90*b* that is different from the information processing apparatus 90*a*, after the time notification processing portion 173 notified the information processing apparatus 90*a* of the planned use time, the time notification processing portion 173 notifies the information processing apparatus 90*b* of a time that is obtained by subtracting the elapse time from the planned use time. For example, when a use request for use of its associated image processing apparatus is received from the information processing apparatus 90*b* at a time point when three minutes remain before the planned use time input by the first user finishes, "three minutes" is notified to the information processing apparatus 90*b* as the remaining time. With this configuration, the information processing apparatus 90*b* is notified of the remaining time, without the first user inputting the planned use time second time. This eliminates the time and effort of the first user. Upon the notification, for example, "planned use time: 3 minutes remaining, number of users in waiting queue: 2, your number in waiting queue: 2" is displayed on the display portion 91*b* of the information processing apparatus 90*b*.

Figure 6:
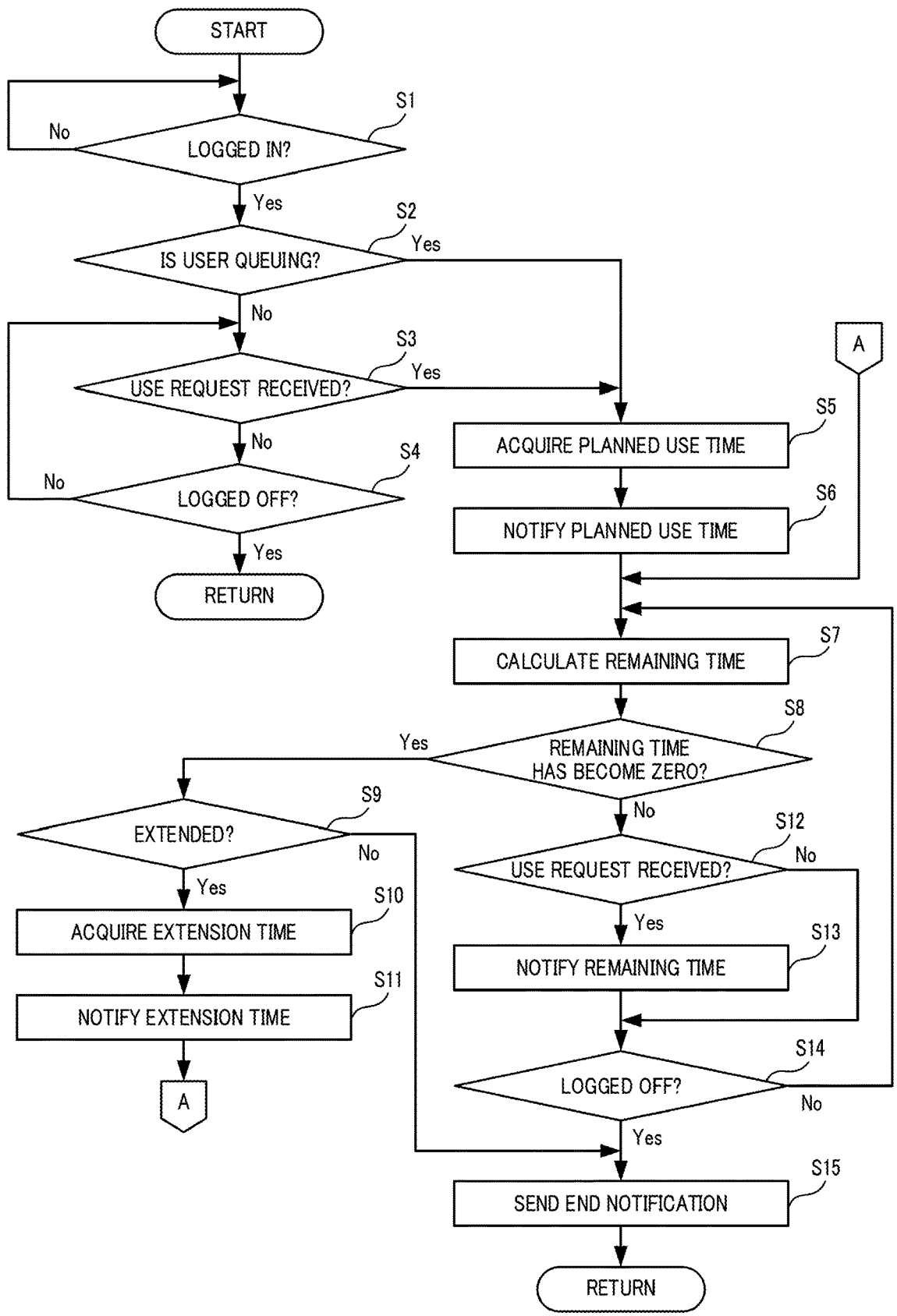
FIG. 6 is a flowchart showing an example of a procedure of a waiting time notification process executed in the image processing apparatus according to the embodiment of the present disclosure.

In the following, an example of the procedure of the waiting time notification process executed by the control portion 17 is described with reference to FIG. 6. Here, steps S1, S2, . . . represent numbers assigned to the processing procedures (steps) executed by the control portion 17. It is noted that the waiting time notification process is, for example, started in response to a power-on of the image processing apparatus 1, and then is ended in response to a power-off of the image processing apparatus 1.

<Step S1>

First, in step S1, the control portion 17 determines whether or not a user has logged in. For example, upon detecting a log-in operation performed on the operation/display portion 11, the control portion 17 determines that a user has logged in. When it is determined that a user has logged in (S1: Yes), the process moves to step S2. On the other hand, when it is determined that a user has not logged in (S1: No), the control portion 17 repeats step S1 until it is determined that a user has logged in.

<Step S2>

In step S2, the control portion 17 determines whether or not a user is in a waiting queue. Specifically, the control portion 17 determines whether or not a user is in a waiting queue based on waiting queue information 20 shown in FIG. 7. The waiting queue information 20 is, for example, generated by the control portion 17 as necessary when a use request is received from an information processing apparatus 90, and is temporarily stored in the RAM.

When it is determined in step S2 that a user is in a waiting queue (S2: Yes), the process moves to step S5. On the other hand, when it is determined that no user is in a waiting queue (S2: No), the process moves to step S3.

<Step S3>

In step S3, the control portion 17 determines whether or not a use request has been received from an information processing apparatus 90. When it is determined that a use request has been received from an information processing apparatus 90 (S3: Yes), the process moves to step S5. On the other hand, when it is determined that a use request has not been received from an information processing apparatus 90 (S3: No), the process moves to step S4.

It is noted that when it is determined in step S3 that a use request has been received from an information processing apparatus 90 (S3: Yes), the control portion 17 generates the waiting queue information 20 based on address information (for example, an IP address) of the information processing apparatus 90 that is the transmission source of the use request. In this example, the information processing apparatus 90 that is the transmission source of the use request, is registered in the waiting queue information 20 as the first information processing apparatus 90 in the waiting order.

<Step S4>

In step S4, the control portion 17 determines whether or not a user who was logged in has logged off. When it is determined that a user who was logged in has logged off (S4: Yes), the process returns to step S1. On the other hand, when it is determined that a user who was logged in has not logged off (S4: No), the process returns to step S3.

<Step S5>

In step S5, the control portion 17 acquires a planned use time of the user who is currently logged in. Specifically, the control portion 17 displays an input screen shown in FIG. 4 on the operation/display portion 11, and acquires a planned use time of the user who is currently logged in, via an input operation performed on the input screen by the user who is currently logged in.

<Step S6>

In step S6, the control portion 17 notifies information processing apparatuses 90 of users who are in the waiting queue (including the information processing apparatus 90 that is the transmission source of the use request), of the planned use time acquired in the step S5 of the user who is currently logged in.

<Step S7>

In step S7, the control portion 17 calculates the remaining time of the planned use time, based on: the planned use time acquired in the step S5 of the user who is currently logged in; and an elapse time from a time point when the planned use time was acquired. For example, when the planned use time acquired in the step S5 of the user who is currently logged in, is ten minutes, and the elapse time from a time point when the planned use time was acquired, is three minutes, the remaining time is calculated as seven minutes.

<Step S8>

In step S8, the control portion 17 determines whether or not the remaining time calculated in step S7 has become zero. When it is determined that the remaining time calculated in step S7 has become zero (S8: Yes), the process moves to step S9. On the other hand, when it is determined that the remaining time calculated in step S7 has not become zero (S8: No), the process moves to step S12.

<Step S9>

In step S9, the control portion 17 determines whether or not the planned use time should be extended. Specifically, the control portion 17 displays on the operation/display portion 11 a confirmation screen that urges the user who is currently logged in to select whether or not to extend the planned use time, and determines whether or not the planned use time should be extended, in accordance with a selection result of the user made on the confirmation screen.

When it is determined in step S9 that the planned use time should be extended (S9: Yes), the process moves to step S10. On the other hand, when it is determined that the planned use time should not be extended (S9: No), the process moves to step S15.

It is noted that when it is determined that the planned use time should not be extended (S9: No), the control portion 17, for example, displays on the operation/display portion 11 a confirmation screen that asks the user who is currently logged in whether or not to save the current setting information. Subsequently, the control portion 17 saves the current setting information in response to a predetermined operation of the user performed on the confirmation screen (for example, a press of the "save" button), in the storage portion 16 in association with identification information of the user who is currently logged in.

<Step S10>

In step S10, the control portion 17 acquires an extension time (namely, a new planned use time) from the user who is currently logged in. Specifically, the control portion 17 displays, on the operation/display portion 11, an input screen for an extension time, and acquires an extension time via an input operation performed on the input screen by the user who is currently logged in.

<Step S11>

In step S11, the control portion 17 notifies the information processing apparatuses 90 of the users who are in the waiting queue (including the information processing apparatus 90 that is the transmission source of the use request), of the extension time acquired in the step S10. After this, the process returns to step S7.

<Step S12>

In step S12, the control portion 17 determines whether or not a use request has been received from a new information processing apparatus 90 (namely, an information processing apparatus 90 that is different from the information processing apparatus 90 that is the transmission source of the use request received in the step S3). When it is determined that a use request has been received from a new information processing apparatus 90 (S12: Yes), the process moves to step S13. On the other hand, when it is determined that a use request has not been received from a new information processing apparatus 90 (S12: No), the process moves to step S14.

It is noted that when it is determined in step S12 that a use request has been received from a new information processing apparatus 90 (S12: Yes), the control portion 17 updates the waiting queue information 20 based on address information (for example, IP address) of the new information processing apparatus 90. For example, in a case where two information processing apparatuses 90 have already been registered in the waiting queue information 20, the new information processing apparatus 90 is registered in the waiting queue information 20 as an information processing apparatus 90 whose number in the waiting queue is 3 (third).

<Step S13>

In step S13, the control portion 17 notifies the new information processing apparatus 90 of the remaining time calculated in the step S7. At this time, the control portion 17 may notify the new information processing apparatus 90 of the number of users who are in the waiting queue, and what number in the waiting queue its user is, as well as the remaining time.

<Step S14>

In step S14, the control portion 17 determines whether or not a user who was logged in has logged off. When it is determined that a user who was logged in has logged off (S14: Yes), the process moves to step S15. On the other hand, when it is determined that a user who was logged in has not logged off (S14: No), the process returns to step S7.

<Step S15>

In step S15, the control portion 17 sends an end notification (namely, a notification that a user who was logged in has logged off) to each of the information processing apparatuses 90 registered in the waiting queue information 20. The control portion 17 then updates the waiting queue information 20. Specifically, the control portion 17 deletes the information processing apparatus 90 whose number is 1 (first), from the waiting queue information 20 and decreases the numbers of the remaining information processing apparatuses 90 in the waiting list by one. Subsequently, the process returns to step S1.

It is noted that the processes of the steps S1, S4 and S14 (the use determination step) are executed by the use determination processing portion 171 of the control portion 17. The processes of the steps S5 and S10 (the first acquisition step) are executed by the first acquisition processing portion 172 of the control portion 17. The processes of the steps S6, S11 and S13 (the time notification step) are executed by the time notification processing portion 173 of the control portion 17. The process of the step S9 is executed by the extension confirmation processing portion 174 of the control portion 17. The process of the step S15 is executed by the end notification processing portion 176 of the control portion 17.

Meanwhile, when it is determined in the step S12 that a use request has been received from a new information processing apparatus 90, the new information processing apparatus 90 is notified of the remaining time in the step S13. At this time, the control portion 17 may acquire the planned use times of the users of the other information processing apparatuses 90 that are in the waiting queue, and notify the new information processing apparatus 90 of the planned use times, as well as the remaining time. For example, in a case where a use request has been received from the information processing apparatus 90b after the time notification processing portion 173 notified the information processing apparatus 90a of a planned use time of the user who is currently logged in, the second acquisition processing portion 177 of the control portion 17 may acquire a planned use time from the information processing apparatus 90a.

Specifically, the second acquisition processing portion 177 transmits an acquisition request to the information processing apparatus 90a, wherein the acquisition request requests the information processing apparatus 90a to acquire a planned use time. Upon receiving the acquisition request, the printer driver of the information processing apparatus 90a displays, for example, the input screen shown in FIG. 8 on the display portion 91a of the information processing apparatus 90a. Subsequently, the printer driver of the information processing apparatus 90a transmits a planned use time input by the user of the information processing apparatus 90a, to the image processing apparatus 1. The time notification processing portion 173 of the image processing apparatus 1 notifies the information processing apparatus 90b of: a remaining time that is obtained by subtracting the elapse time from the planned use time of the user who is currently logged in, the planned use time having been acquired by the first acquisition processing portion 172; and the planned use time acquired by the second acquisition processing portion 177. As a result of this, the planned use time (remaining time) of the user who is currently using the image processing apparatus 1, and a planned use time of another user who is in the waiting queue, are displayed on the display portion 91b of the information processing apparatus 90b, as shown in FIG. 9, for example. Accordingly, even the users whose numbers in the waiting queue are 2 (second) and onward can grasp the approximate times when the users will become able to use the image processing apparatus 1.

As described above, in the image processing apparatus 1 according to the present embodiment, users who are in the waiting queue are notified of a planned use time that is input by a user who is currently using the image processing apparatus 1. As a result, it is possible to notify the users who are in the waiting queue, of approximate times when the users will become able to use the image processing apparatus 1.

It is noted that in the present embodiment, in the information processing apparatus 90, a function to transmit a use request to the image processing apparatus 1, and a function to display, on a display portion, a planned use time notified from the image processing apparatus 1, are implemented by the printer driver. However, the present disclosure is not limited to this configuration. These functions may be implemented by an arbitrary software program other than the printer driver.

In addition, in the present embodiment, when the remaining time of the planned use time has become zero, it is confirmed whether or not the planned use time should be extended. However, the present disclosure is not limited to this configuration. As another embodiment, when the remaining time of the planned use time has become one minute, it may be confirmed whether or not the planned use time should be extended. As a further embodiment, the image processing apparatus 1 may be configured such that a user who is currently logged in can extend the planned use time at arbitrary timing.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a processor configured to execute:
a use determination processing portion configured to determine whether or not its associated information processing apparatus is in use;
a first acquisition processing portion configured to, when a use request of its associated information processing apparatus is received in a state where the use determination processing portion has determined that its associated information processing apparatus is in use, acquire a planned use time of its associated information processing apparatus via an input operation performed on an operation portion of its associated information processing apparatus; and
a time notification processing portion configured to notify a first information processing apparatus that is a transmission source of the use request, of the planned use time acquired by the first acquisition processing portion.

2. The information processing apparatus according to claim 1, wherein the first acquisition processing portion displays an input screen for the planned use time on a display of its associated information processing apparatus, and acquires the planned use time via an input operation performed on the input screen.

3. The information processing apparatus according to claim 1, the processor further configured to execute:
an extension confirmation processing portion configured to, when a remaining time of the planned use time has reached a predetermined time after the planned use time was acquired by the first acquisition processing portion, confirm whether or not the planned use time needs to be extended, via an input operation performed on the operation portion, wherein
when the extension confirmation processing portion has confirmed that the planned use time needs to be extended, the first acquisition processing portion acquires a new planned use time via an input operation performed on the operation portion, and
the time notification processing portion notifies the first information processing apparatus of the new planned use time acquired by the first acquisition processing portion.

4. The information processing apparatus according to claim 3, the processor further configured to execute:
a saving processing portion configured to, in a case where the extension confirmation processing portion has confirmed that the planned use time does not need to be extended, save current setting information that has been set via an input operation performed on the operation portion.

5. The information processing apparatus according to claim 1, the processor further configured to execute:
an end notification processing portion configured to, in a case where the use determination processing portion has determined that its associated information processing apparatus is not in use after the time notification processing portion notified the first information processing apparatus of the planned use time, notify the first information processing apparatus that its associated image processing apparatus has become usable.

6. The information processing apparatus according to claim 1, wherein
when a use request for use of its associated information processing apparatus is received from a second information processing apparatus that is different from the first information processing apparatus, after the time notification processing portion has notified the first information processing apparatus of the planned use time, the time notification processing portion notifies the second information processing apparatus of a time obtained by subtracting an elapse time from the planned use time.

7. The information processing apparatus according to claim 1, the processor further configured to execute:
a second acquisition processing portion configured to, when a use request for use of its associated information processing apparatus is received from a second information processing apparatus that is different from the first information processing apparatus, after the time notification processing portion has notified the first information processing apparatus of the planned use time, acquire a planned use time from the first information processing apparatus, wherein
the time notification processing portion notifies the second information processing apparatus of: a remaining time that is obtained by subtracting an elapse time from the planned use time acquired by the first acquisition processing portion; and the planned use time acquired by the second acquisition processing portion.

8. The information processing apparatus according to claim 1, the processor further configured to execute at least one of:
   an image reading portion configured to read an image from a document sheet; and
   an image forming portion configured to form an image on a sheet.

9. A control method of an information processing apparatus comprising a processor, and a memory storing instructions that, when executed by the processor, cause the information processing apparatus to perform the control method comprising:
   a use determination step of determining, via the processor, whether or not its associated information processing apparatus is in use;
   a first acquisition step of, when a use request of its associated information processing apparatus is received by the processor in a state where the processor has determined in the use determination step that its associated information processing apparatus is in use, acquiring, via the processor, a planned use time of its associated information processing apparatus via an input operation performed on an input screen of its associated information processing apparatus; and
   a time notification step of notifying, via the processor, a first information processing apparatus that is a transmission source of the use request, of the planned use time acquired in the first acquisition step.

* * * * *